Feb. 17, 1959 J. F. FOSTER 2,874,371

INFORMATION STORAGE SYSTEM

Filed Sept. 23, 1954 3 Sheets-Sheet 1

INVENTOR.
JERRY F. FOSTER

BY

Christie, Parker & Hale
ATTORNEYS

Feb. 17, 1959 J. F. FOSTER 2,874,371

INFORMATION STORAGE SYSTEM

Filed Sept. 23, 1954 3 Sheets-Sheet 2

INVENTOR.
JERRY F. FOSTER

BY

Christie, Parker & Hale
ATTORNEYS

INFORMATION STORAGE SYSTEM

Filed Sept. 23, 1954 3 Sheets-Sheet 3

INVENTOR.
JERRY F. FOSTER
BY
Christie, Parker & Hale
ATTORNEYS

United States Patent Office 2,874,371

Patented Feb. 17, 1959

2,874,371

INFORMATION STORAGE SYSTEM

Jerry F. Foster, Pasadena, Calif., assignor, by mesne assignments, to Burroughs Corporation, Detroit, Mich., a corporation of Michigan Application September 23, 1954, Serial No. 457,834

3 Claims. (Cl. 340—174)

The present invention relates to information storage systems, and more particularly, to improved apparatus for storing information in a manner in which it is readily accessible.

One known system for recording information is to move a magnetizable medium relative to recording transducers so that the medium is magnetized in accordance with signals applied to the transducers. Such a magnetizable medium might take the form of a magnetizable wire, a tape having a coating of magnetizable material, or a drum having a magnetizable periphery, for example.

In one type of memory system, digital information is stored in bands around the magnetizable periphery of a drum. In some systems a main section of the drum is devoted to bulk storage, while another section is devoted to the storage of information in such a way that it is accessible more quickly than the information stored in the main memory section. Therefore, where particular information is to be used again and again, that information may be transferred from the main memory section to a quick access section. By this means, the time required to locate and derive the particular information may be reduced.

Ordinarily, in a magnetic drum memory system, information is recorded in locations having assigned addresses so that a selected piece of information may be derived by referring to the assigned address. In the copending U. S. patent application, filed on July 9, 1953, Serial No. 435,563, in the name of Ernst S. Selmer, and entitled "Control Apparatus for Digital Computing Machinery," there is described a system for locating an address and transferring a selected quantity of information from the main memory section to the quick access section of a magnetic drum.

In a system in which the information is recorded on a drum in sectors which are identified by synchronizing signals, such as timing signals recorded on a separate band of the drum, a difficulty arises due to the fact that a certain amount of time lag exists in the recording and reading processes. That is, where an electrical signal is applied to a recording transducer at a given instant, the corresponding magnetization of the recording medium will be slightly delayed. Likewise, when the information is derived from the recording medium, the electrical signal is delayed in time with respect to the time when the actual magnetization appears under the reading transducer. Where separate transducers are used throughout for recording and reading, this difficulty may be overcome by suitably positioning the transducers with respect to the drum, e. g., by precessing the transducers. If, on the other hand, the same transducers are to be employed for both reading and writing, the difficulty cannot be overcome by positioning alone.

This difficulty is particularly bothersome where a magnetic drum has a main memory or bulk storage section in which the same set of transducers is employed to both read and write, and in which a recirculating loop type of quick access memory is used.

In accordance with my invention, I provide an improved type of recirculating loop quick access memory system in which the times for recording and reading are arranged so that information may be recorded or read in substantial synchronism with a source of timing pulses. In addition, where the quick access memory of my invention is employed in connection with a main memory in which the same transducers are used for both recording and reading, the timing difficulty mentioned above is overcome so that information may be recorded or read from either the main memory section or the quick access memory section and transferred between the sections in substantial synchronism with timing signals.

In one embodiment of my invention I provide a quick access memory in which a recording transducer is positioned to record information on a movable magnetizable storage medium, reading transducers are placed in precessed position for reading signals recorded by the recording transducers, and an electrical signal delaying means is connected between the reading transducers and the recording transducers so that a recirculating memory is provided wherein information is recirculated via the recording transducers, the storage medium, the reading transducers and the delaying means.

A better understanding of my invention may be had upon a reading of the following specification and an inspection of the drawings, in which.

Figure 1:
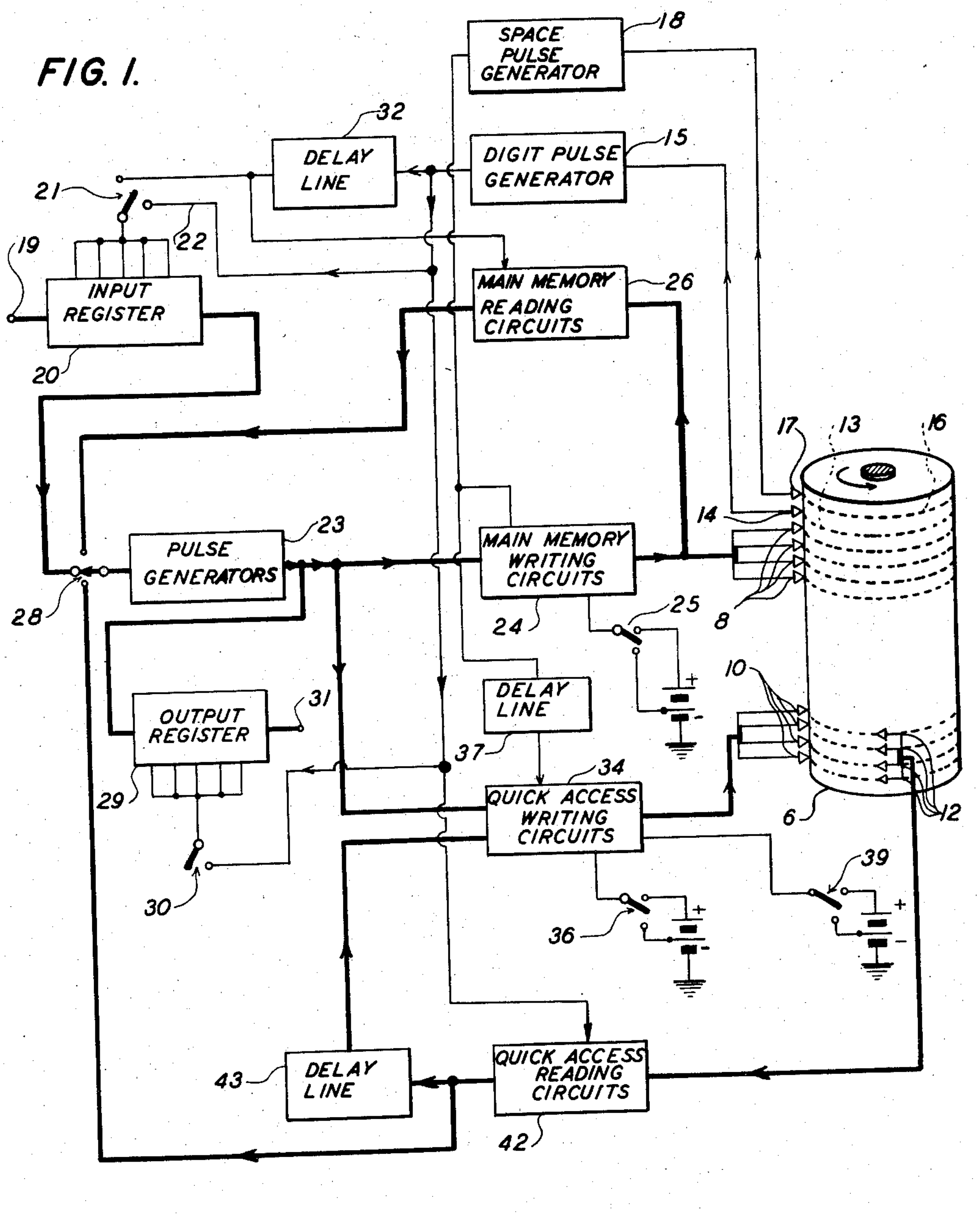
Fig. 1 is a block diagram of a memory system including an embodiment of my invention.

In Fig. 1, the information storage medium is a rotating magnetic drum 6 having a magnetizable periphery, although the invention is not restricted thereto. The information to be stored on the magnetic drum 6 comprises digits which are coded in binary coded decimal notation. That is, the individual digits of a multiple digit number are handled serially one after another and are each coded in a binary notation. For example, where "0's" and "1's" are used to designate the binary digits, one suitable binary code is as follows:

| Number | Binary Code | | | |
|---|---|---|---|---|
| | 1 | 2 | 4 | 8 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

The heavy lines in Fig. 1 represent signal transfer links which are capable of transferring four binary digits comprising a binary coded decimal digit simultaneously. Therefore, the heavy lines of Fig. 1 constitute the information transfer paths, and the light lines constitute control signal lines.

The magnetic drum 6 includes a main memory section for bulk storage having associated therewith the transducers 8, which are adapted to record or read digital information on the drum. In addition, the magnetic drum 6 includes a quick access section, having associated therewith the recording transducers 10 and the reading transducers 12. Timing pulses for synchronizing the apparatus and for identifying given locations on the magnetic drum 6 may be provided by a pre-recorded digit pulse signal track 13 via a reading transducer 14 and a digit pulse generator 15. Where the information to be recorded comprises multiple digit numbers, space pulses for separating the multiple digit numbers may be derived from a pre-recorded signal track 16 via a reading transducer 17 and a space pulse generator 18.

To introduce information into the memory system of Fig. 1, suitable electrical signals representing binary coded decimal digits may be applied to an input signal transfer link represented diagrammatically as a terminal 19 and shifted into an input register 20. The input register 20 may comprise a conventional shifting register having a plurality of decades which are interconnected so that a binary coded decimal digit may be shifted along the register. Pulses for causing the input register 20 to shift may be derived directly from the digit pulse generator 15 by placing the switch 21 in the position where pulses appearing on the line 22 are applied to each decade.

After a number is registered in the input register 20, the digits may be passed to the main memory section transducers 8 via a set of pulse generators 23 and the main memory writing circuits 24. As will be described in detail later, the main memory writing circuits 24 may be actuated to pass signals to the transducers 8 by lowering the potential in a part of the writing circuit, as for example, by placing the switch 25 in its low potential position.

The system of recording used in one successful embodiment of the invention is the so-called non-return to zero system, in which two different degrees of magnetization of the magnetic drum are used to indicate the values of the binary digits. In such a system, a reading transducer generates a signal only when a change in condition of magnetization occurs. Consequently, a reference must be established at the beginning of a reading operation so that in the event no change in magnetization occurs, the value of the digit is known. This may be accomplished in the memory system of Fig. 1 by applying a space pulse from the space pulse generator 18 to the main memory writing circuits 24 so that the transducers 8 will magnetize periodically a sector of the magnetic drum 6 to a selected degree of magnetization, such as the degree of magnetization representing the binary digit "0." This means that if the next binary digit applied to any of the transducers 8 equals "0," the condition of magnetization of the magnetic drum 6 will continue to be the same. However, if a binary "1" digit is applied to any of the transducers 8, the drum will be magnetized to its second condition.

When information is to be derived from the main memory section, the main memory reading circuits 26 receive information signals for each change of condition of magnetization of the drum 6 passing under the transducers 8. In the reading circuits 26 the signals are used to gate synchronizing signals from the delay line 32. By connecting the switch 28 to the main memory reading circuits 26, the gated signals are passed to the output register 29 via the pulse generators 23. By closing a switch 30, shift pulses may be applied to the output register 29 so as to shift the digits along the register. The output register 29 may be of similar construction to the input register 20 described above. In order to derive a number registered in the output register 29, the register may be caused to shift by closing the switch 30 and electrical signals representing the binary coded digits may be applied to auxiliary equipment (not shown) via an output signal transfer link represented diagrammatically as a terminal 31.

As previously noted, one of the difficulties encountered in a memory system using a magnetic storage medium is that there is a certain amount of electrical inertia in the recording and the reading process. This means that when a signal is being recorded, the resultant change in magnetization of the magnetic drum 6 lags slightly behind the actual change in the electrical signal. Likewise, when recorded information is being derived from the magnetic drum 6, the electrical signal generated by the transducers lags slightly behind the actual passage of the change of magnetism under the transducers.

In some types of magnetic recording systems this time delay is immaterial. However, in a memory system for use in apparatus which is synchronously operated in accordance with timing pulses derived from a magnetic drum, as for example digital computers, the time delay may result in faulty operation. Even in some instances in synchronously operated equipment, however, the equipment can tolerate a small lag of synchronism between the recording and reading process. When information is read from the main memory section of the magnetic drum 6 of Fig. 1, the tolerance of the output register 29 is sufficient to receive signals which are slightly delayed. The ordinary time delay in reading from the main memory section is of the order of two microseconds and consequently, by connecting a delay line 32 to the output of the digit pulse generator 15, properly timed synchronizing pulses, sometimes called "strobing" pulses, may be applied to the main memory reading circuits 26. The time relationship of the signals and the magnetization of the main memory section is shown in Figs. 2(*a*), (*b*) and (*c*).

Figure 2:
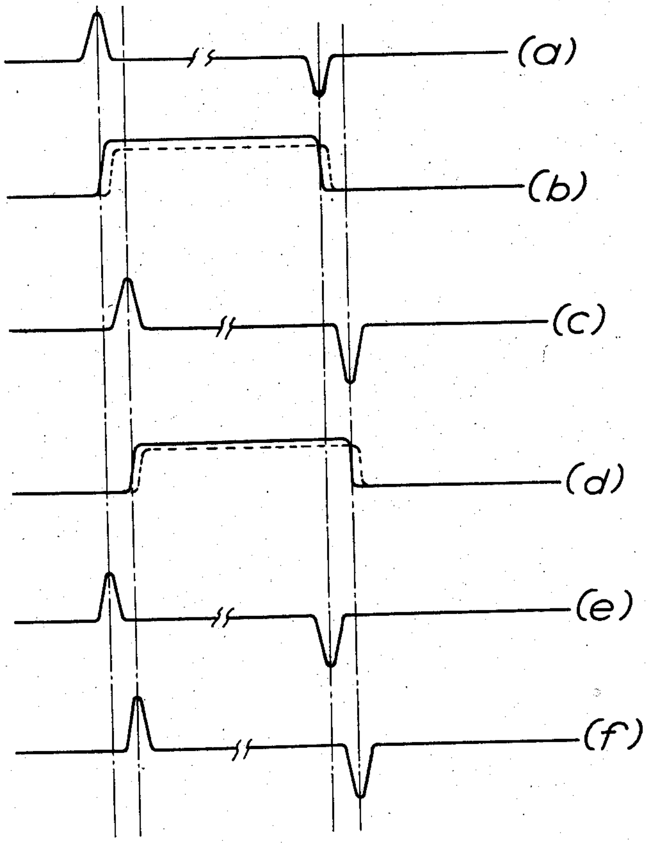
Fig. 2 is a set of graphical illustrations showing the time relationship between certain information signals in the system of Fig. 1.

Fig. 2(*a*) represents a binary "1" representing electrical signal from the pulse generators 23 followed by a binary "0" representing electrical signal from the pulse generators 23. The main memory writing circuits 24 include a bi-stable circuit which is adapted to assume one stable condition of operation in response to a binary "1" representing electrical signal, and to assume another stable condition of operation in response to a binary "0" representing electrical signal.

Fig. 2(*b*) illustrates an electrical signal which may be derived from such a bi-stable circuit. In the non-return to zero system of recording, the electrical signal of Fig. 2(*b*) may be applied directly to one of the transducers 8. The dashed line of Fig. 2(*b*) represents the resultant change in the condition of magnetization of the magnetic drum 6 in response to the signal. It will be noted that the magnetization of the drum is slightly delayed due to the electrical inertia discussed above.

Assuming that the previously recorded information is to be derived from the magnetic drum 6 on a subsequent passage of the information under the transducers 8, the signal induced across one of the transducers 8 will be as shown in Fig. 2(*c*). It will be noted that the signal follows the same general wave form as that of Fig. 2(*a*) with a positive going pulse indicating a binary "1," while a negative going pulse indicates a binary "0." However, the signals are somewhat delayed in time.

By applying a delayed digit pulse synchronizing signal to a gate, the main memory reading circuits 26 are enabled to pass a pulse to the output register 29 via the switch 28 and the pulse generators 23 corresponding to the signal read by the transducers 8. Although the output register 29 will tolerate this small time delay, a difficulty arises when information is to be transferred from the main memory section to the quick access section of the memory.

The operation may be accomplished by enabling the main memory reading circuits 26 to read information, passing the electrical signal from the main memory reading circuits 26 to the quick access writing circuits 34 via the switch 28 and the pulse generators 23. However, the signals arriving at the quick access writing circuits 34 from the main memory reading circuits 26 will be delayed as shown in Fig. 2(*c*), and consequently the recording by the transducers 10 will be likewise delayed. The quick access writing circuits 34 are similar to the main memory writing circuits 24 and are actuated for writing by connecting a switch 36 to its low voltage position.

In a similar manner to that described above with respect to the main memory section, a reference must be established in the quick access section at the beginning of each reading interval. For this purpose a space pulse from the space pulse generator 18 may be applied to the quick access writing circuits 34 via a delay line 37, so as to record an area in the quick access section of the magnetic drum 6 representing the binary digit "0." The time delay of the delay line 37 should correspond to the time delay introduced by the reading and writing in the main memory section. As noted above, in one successful embodiment the time delay was two microseconds. Since the information passed to the quick access writing circuits 34 from the main memory reading circuits 26 is delayed in time, the resultant recordation by the transducers 10 will be delayed by an interval equal to the delay introduced by the main memory and, in addition, by an interval equal to the delay introduced by the electrical inertia of recording in the quick access section.

A wave form which may be derived from a bi-stable circuit in the quick access writing circuits is shown in Fig. 2(*d*) and the resultant magnetization of the portion of the magnetic drum passing under the quick access memory transducers 10 is shown by means of the dashed line.

When information is to be introduced into the quick access memory directly from the input register 20, the switch 21 may be placed in a position where shift pulses are supplied via the delay line 32. The information then may be passed to the quick access writing circuits 34 via the pulse generators 23 and the switch 28. The shift pulses applied to the input register 20 are delayed by an amount corresponding to the time delay with which writing is accomplished in the quick access memory section so that information is supplied to the quick access writing circuits 34 at the proper time.

After a predetermined amount of information has been recorded by the quick access reading transducers 10, the information may be recirculated in the quick access memory by placing the switch 36 in its high potential position and the switch 39 in its low potential position. With the switches in the recirculate position, the information recorded by the quick access writing transducers 10 will be read by the quick access reading transducers 12 and passed to the quick access writing circuits 34 via the quick access reading circuits 42 and a delay line 43. The quick access reading transducers 12 should be positioned with respect to the drum 6 in such a way that the magnetization passing under the quick access reading transducers 12 causes an electrical signal to be generated which is substantially in synchronism with the timing pulses from the digit pulse generator 15. This means that the quick access reading transducers 12 should be precessed by an amount equal to the time delay in the main memory section between recording and reading plus the time delay in the quick access section between recording and reading.

Fig. 2(*e*) shows a wave which may be derived from the quick access reading transducers 12 and this wave may be gated or "strobed" by pulses derived directly from the digit pulse generator 15. The information signals appearing at the output of the quick access reading circuits 42 may be applied to an output register 29 via the pulse generators 23, and will be in synchronized time relation with respect to the shift pulses applied to the register.

When information is to be recirculated, the signals from the quick access reading circuits 42 cannot be passed directly to the quick access writing circuits 34 since the quick access writing circuits are adapted to write at a time which is delayed with respect to the time of reading. Hence, the signals are passed to the quick access writing circuits 34 via the delay line 43 in order that the signals from the quick access reading circuits 42 may be applied to the quick access writing circuits 34 at the proper time.

The information signals appearing at the output of the delay line 43 are shown in Fig. 2(*f*) and referring to the wave of Fig. 2(*c*), it will be seen that the signals appear in proper time relation for application to the quick access writing circuits 34.

In overall operation, therefore, the memory system of Fig. 1 includes apparatus which is adapted to record information in either a main memory section or a quick access memory section in synchronism with a source of basic timing pulses. In addition, the system is adapted to read from either the main memory section or the quick access memory section in synchronism with the basic timing signals, and to transfer information between the main memory section and the quick access memory section.

For the sake of convenience, conventional switches have been shown in Fig. 1 to control the operation of the various parts. However, it will be appreciated that suitable electronic devices may be employed for the same purpose. Normally, the control devices may form a part of a central memory control circuit which is adapted to energize the various parts in accordance with a selected operation to be performed.

Figure 3:
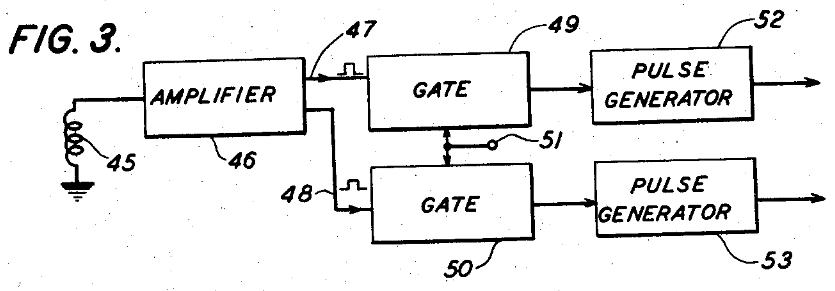
Fig. 3 is a block diagram of one form of apparatus which may be employed in the reading circuits of Fig. 1.

The apparatus of the block diagram of Fig. 3 may be employed in the main memory reading circuits 26 and the quick access reading circuits 42 of the memory system of Fig. 1. In Fig. 3, the winding of a reading transducer 45 is connected to the input of an amplifier 46 which is adapted to provide separate output signals for binary "1" signals and binary "0" signals. When a change in the degree of magnetization occurs between a "0" and "1," a positive going pulse appears on the line 47. In contrast, when the degree of magnetization passing the transducer 45 changes from a "1" to "0," a positive pulse appears on the line 48. These pulses are synchronized with the digit pulses which, in the case of the main memory reading circuits 26 of Fig. 1 are delayed, but in the case of the quick access reading circuits 42 are not delayed, by means of the gates 49 and 50, to which the digit pulses may be applied by a terminal 51. The information signals passed by the gates 49 and 50 are then applied to the pulse generators 52 and 53 which are adapted to provide output pulses of a desired wave shape.

When a reading circuit system as that of Fig. 3 is employed, it will be noted that the "0" signals and the "1" signals are handled separately. This means that the signal transfer links which are adapted to handle the transfer of information in the memory system of Fig. 1 might comprise eight separate signal lines. It will be appreciated that the main memory writing circuits 24 include four circuits like Fig. 3, one of which is associated with each of the main memory transducers 8. Likewise, the quick access reading circuits 42 include four circuits like Fig. 3, one of which is associated with each of the quick access reading transducers 12.

Figure 4:
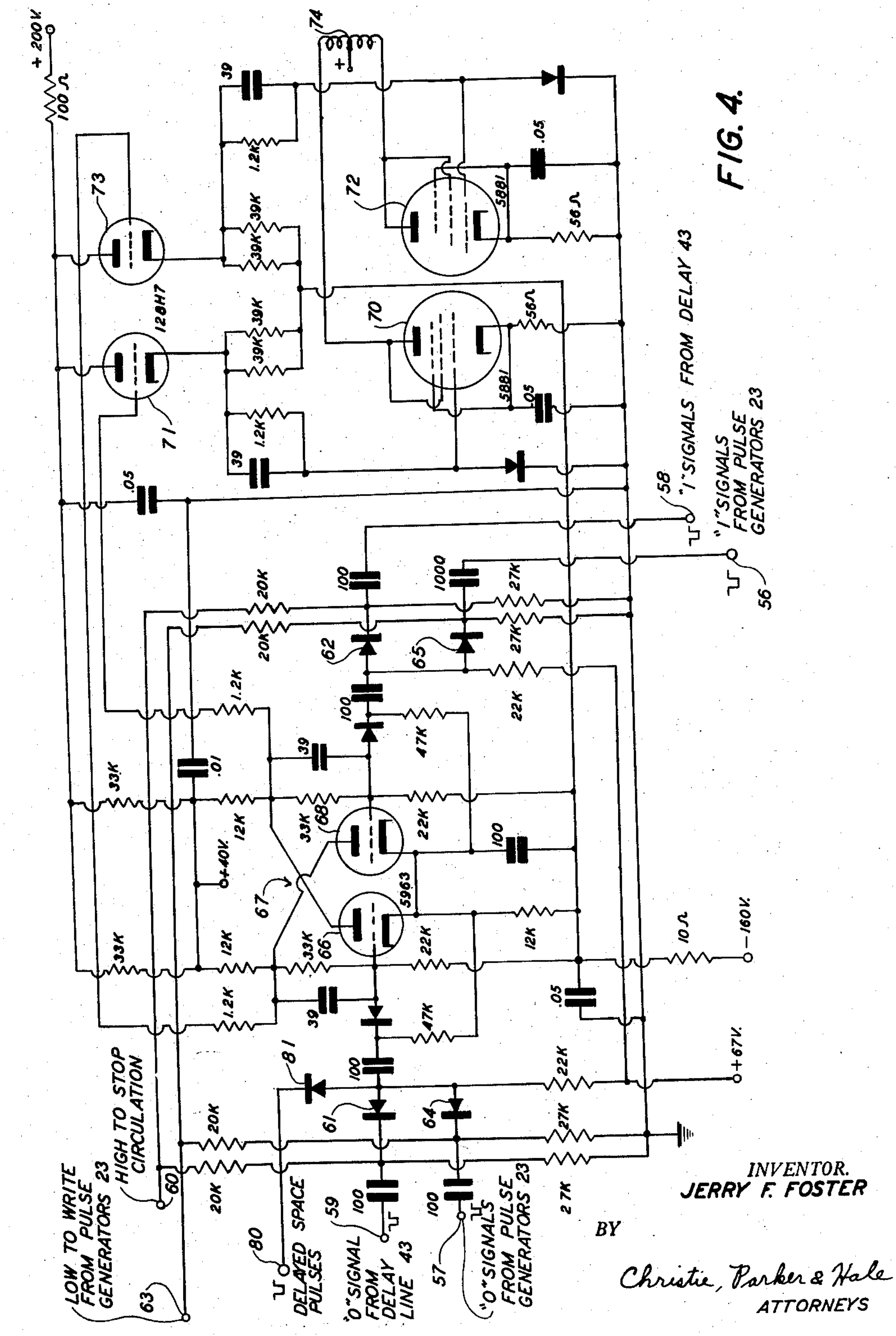
Fig. 4 is a schematic circuit diagram of one form of apparatus which may be employed in the writing circuits of Fig. 1.

The schematic circuit diagram of Fig. 4 shows one form of apparatus which may be employed in the quick access memory writing circuits 34 of Fig. 1. Where the system is adapted to handle four binary digits in time parallel, as in the system of Fig. 1, four circuits like that of Fig. 4 would be employed in the quick access writing circuits 34. With slight modification, to be described in detail later, the circuit of Fig. 4 may be used as one of four circuits in the main memory writing circuits 24 of Fig. 1.

In the quick access writing circuits 34, the "1" indicating signals from the pulse generators 23 may be applied to a terminal 56 and the "0" indicating signals may be applied to a terminal 57. The "1's" output signals from the quick access reading circuits appearing via the delay line 43 may be applied to a terminal 58 while the "0" signals from the delay line 43 may be applied to a terminal 59.

When information is to be recorded from the pulse generators 23, a control voltage which is relatively high, say of the order of 170 volts, may be applied to a terminal 60, which causes a gating diode 61 associated with the "0" input to be rendered non-conducting, and a gating diode 62 associated with the "1" signal input to be rendered non-conducting. In addition, a relatively low voltage, say of the order of 115 volts, applied to a terminal 63 renders the gating diode 64 associated with "0" signal input conducting, and a gating diode 65 associated with the "1" signal input conducting.

When the circuit is in this condition of operation, the "0" signals from the pulse generators 23 are passed to a left-hand electron tube 66 forming a part of a bi-stable circuit 67, which places the bi-stable circuit 67 in that condition in which the electron tube 66 is cut off and the electron tube 68 is conducting. In like manner, "1" signals from the pulse generators 23 are passed to the right-hand electron tube 68 of the bi-stable circuit 67 so as to place the bi-stable circuit in the condition of operation in which the right-hand electron tube 68 is cut off while the left-hand electron tube 66 is rendered conducting. As a consequence, the voltage at the anode of the left-hand electron tube 66 will be relatively low after a "1" signal appears, or relatively high after a "0" signal appears. In contrast, the voltage at the anode of the right-hand electron tube 68 will be relatively low after a "0" signal appears, and relatively high after a "1" signal appears.

By applying a relatively low voltage to the control terminal 60 and a relatively high voltage to the terminal 63, the diodes 61, 62, 64 and 65 may be placed in that condition where the "0" signals from the delay line 43, applied to the terminal 59, are passed to the left-hand electron tube 66 and the "1" signals from the delay line 43, applied to the terminal 58, are passed to the right-hand electron tube 68.

When the bi-stable circuit 67 is in the condition in which the electron tube 66 is cut off, and the electron tube 68 is conducting, i. e., after a "0" signal has appeared, a voltage will be applied to the control electrode of an amplifying electron tube 70 via a cathode follower electron tube 71. In contrast, a relatively low voltage will be applied to the control electrode of the amplifying electron tube 72 from the anode of the electron tube 68 via a cathode follower electron tube 73. This causes a current to flow in a writing transducer winding 74 in a given direction. In contrast, when a "1" signal is applied to the bi-stable circuit 67, the electron tube 66 is rendered conducting and the electron tube 68 is cut off, thereby causing a relatively low potential to appear at the control electrode of the electron tube 70 and a relatively high potential to appear at the control electrode of the electron tube 72. Consequently, after a "1" signal appears, current flows through the writing transducer winding 74 in a direction opposite to that in which it flows after a "0" signal appears.

In order to record a "0" signal to provide a reference for reading, as described above, delayed space pulses may be applied to the left-hand electron tube 66 of the bi-stable circuit 67 via a terminal 80 and a diode 81.

Where the circuitry of Fig. 4 is to be used in the main memory writing circuits 24, the input circuits associated with the terminals 58 and 59 may be omitted, along with the control circuit associated with the terminal 60. The circuit values which are given in Fig. 4 are given by way of example only, being indicative of those which were employed in one successful embodiment. The values of the resistances are given in ohms where $k=1000$, the values of the capacitances are given in micromicrofarads where the number is greater than one and microfarads where the number is less than one, and the potentials are given in volts.

Figure 5:
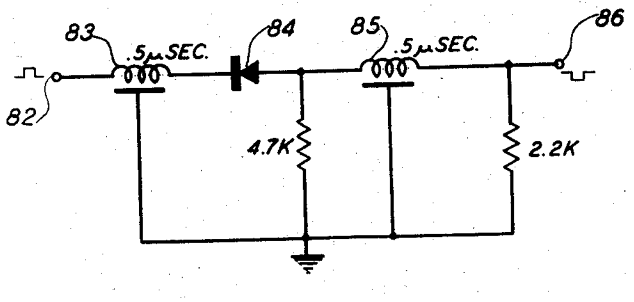
Fig. 5 is a schematic circuit diagram of one type of delay line which may be used in the apparatus of Fig. 1.

The delay line of Fig. 5 is a reflection type delay line which is adapted to provide a time delay of approximately two microseconds. When a positive going pulse is applied to an input terminal 82 it is passed along a first one-half microsecond delay line 83. When the pulse reaches the diode 84 the diode is held non-conducting and, since the delay line 83 is terminated in a very high impedance, the positive going pulse is reflected back toward the terminal 82. Usually the source of pulses applied to the terminal 82 is of relatively low impedance, and when the positive pulse reaches the input end of the delay line 83 it is inverted and reflected back along the delay line toward the diode 84. This time, since the pulse is inverted and is now negative going, the diode 84 is rendered conducting and the negative going pulse is passed to a second one-half microsecond delay line 85. After traversing the delay line 85, the negative going pulse appears at an output terminal 86. Therefore, the overall operation of the circuit of Fig. 5 is such that a positive going pulse applied to the terminal 82 traverses the first delay line 83 a total of three times, during the last of which times it is inverted and traverses a second delay line 85 one time. Consequently, the overall time delay of the circuitry of Fig. 5 is approximately two microseconds. The circuitry of Fig. 5 may be used for each of the delay lines shown in the memory system of Fig. 1.

I claim:

1. In a memory system in which digital information is stored on a magnetizable storage medium including a plurality of sectors and a synchronizing signal track from which may be derived synchronizing signals for identifying each of the sectors, the combination of at least one transducer which is adapted to record information on a first selected area of the storage medium in synchronism with the synchronizing signals, and read information from the first selected area of the magnetic medium in delayed synchronism with the synchronizing signals; at least one transducer which is adapted to record information in a second selected area of a magnetic medium in synchronism with the delayed synchronism of the first section transducer spaced from the last-named transducer; at least one transducer which is adapted to read information from the second selected area of a magnetic medium in exact time synchronism with the synchronizing signals; means for coupling the output of the second section reading transducer to said one transducer for recording information in the first selected area; and delaying means coupled between the second section reading transducer and the second section writing transducer for delaying the information coupled therebetween, whereby a path for recirculating information is provided via the second section writing transducer, the magnetic medium, the second section reading transducer and the delaying means.

2. In a memory system, a storage medium having a plurality of identifiable sectors in each of which may be recorded a selected quantity of information, the combination of a first station, means moving the storage medium relative to the first station, a first recording means positioned at the first station for recording information in alignment with the sectors of the storage medium, a first reading means positioned at the first station for reading information from the sectors of the storage medium to provide signals which are delayed by a given interval in time from the corresponding recorded position on the storage medium, a second station, a second recording means positioned at the second station for recording the delayed signals from the first station reading means, a third station positioned in the direction of movement of the storage medium from the second station, a second reading means positioned at said third station for reading information recorded at the second station, and delaying means coupled between the second reading means and the second recording means, said delaying means having a time delay equal to the given interval of delay in reading by said first reading means.

3. In a memory system, including a recirculating storage medium having a synchronizing signal track from which may be derived synchronizing pulses, the combination comprising means including a first transducer for recording information pulses on the storage medium in synchronism with the timing pulses, means including the first transducer for reproducing on a subsequent recirculation of the recording medium the information pulses in delayed synchronism with the timing pulses, the delay time being substantially less than the interval between timing pulses, means including a second transducer coupled to the output of said reproducing means for recording the delayed information pulses on another part of the recording medium, means including a third transducer spaced from the second transducer along the path of movement of the recirculating storage medium for reproducing the delayed information pulses recorded by the means including the second transducer, the third transducer being spaced from the second transducer by a distance equivalent to the distance traveled by the recording medium in a time interval equal to an integral number of timing pulse intervals less twice said delay time for reproducing the information pulses in exact synchronism with the timing pulses, means including a delay circuit having a delay time equal to said delay time for coupling the information pulses derived from the third transducer to the second transducer, and means for selectively coupling the information pulses derived from the third transducer to the first transducer.

References Cited in the file of this patent

UNITED STATES PATENTS

| | | |
|---|---|---|
| 2,700,755 | Burkhart | Jan. 25, 1955 |
| 2,718,356 | Burrell et al. | Sept. 20, 1955 |
| 2,739,299 | Burkhart | Mar. 20, 1956 |
| 2,770,797 | Hamilton | Nov. 13, 1956 |

OTHER REFERENCES

Publication: "IBM Magnetic Drum Calculator Type 650 Engineering and Design Considerations" by E. S. Hughs, disclosed February 11 and 12, 1954 in the Proceedings of the Western Computer Conference, Los Angeles, Calif. and published in Trends in Computers: Automatic Control and Data Processing by AIEE, April 1954 (pages 141–143, 148, and 150–152).